Figure 1:
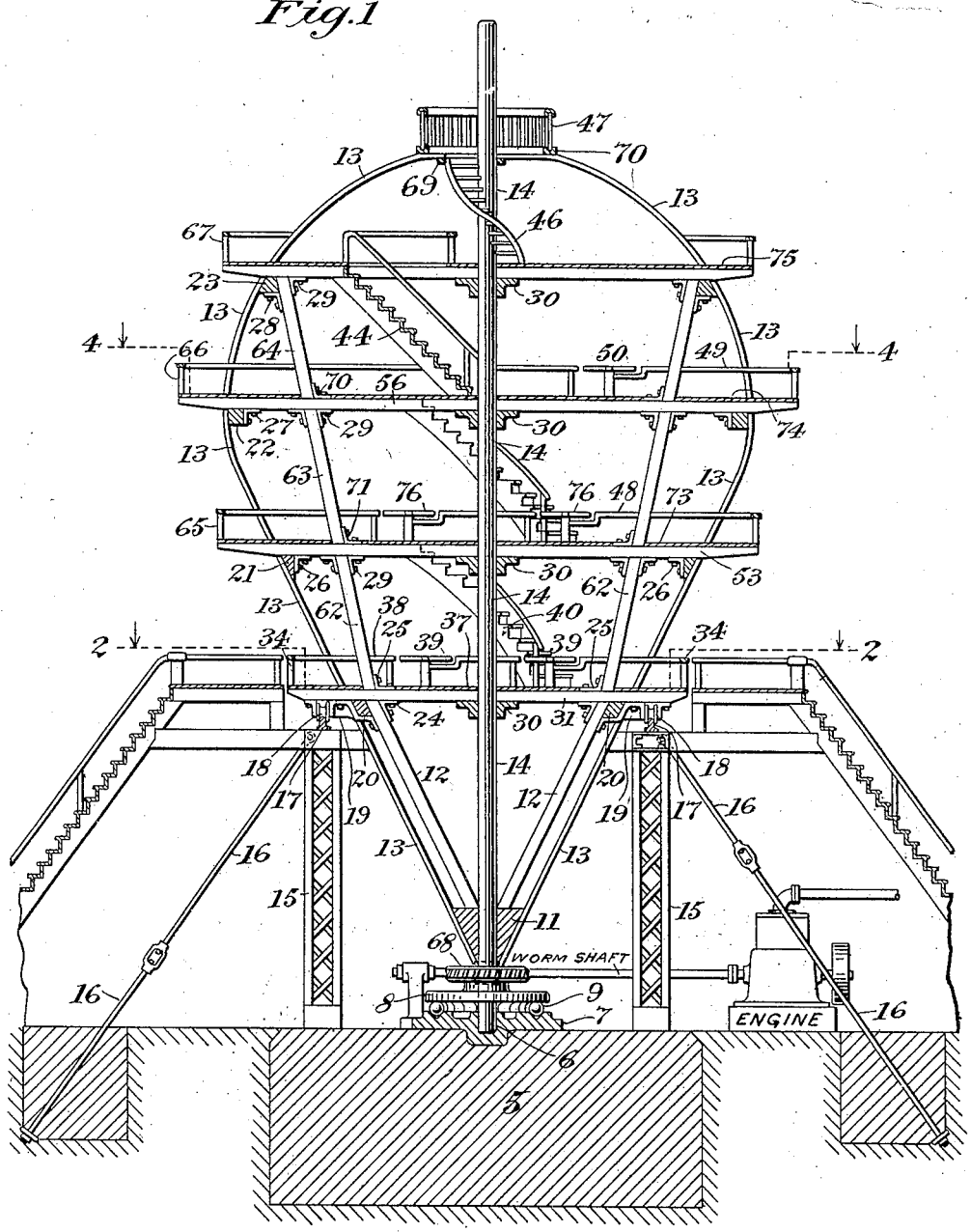

No. 837,890. PATENTED DEC. 4, 1906.
D. W. SHARKEY.
CAROUSEL.
APPLICATION FILED AUG. 4, 1905.

3 SHEETS—SHEET 1.

Witnesses:
Albert N. Day
Henry Barnes

Inventor:
Dominick W. Sharkey
by Henry D. Williams
Atty.

No. 837,890. PATENTED DEC. 4, 1906.
D. W. SHARKEY.
CAROUSEL.
APPLICATION FILED AUG. 4, 1905.

3 SHEETS—SHEET 2.

Witnesses:
Albert W. T. Day
Henry Barnes

Inventor:
Dominick W. Sharkey
by Henry D. Williams
Atty.

No. 837,890. PATENTED DEC. 4, 1906.
D. W. SHARKEY.
CAROUSEL.
APPLICATION FILED AUG. 4, 1905.

3 SHEETS—SHEET 3.

Witnesses:
Albert W. Day
Henry Barnes

Inventor:
Dominick W. Sharkey
by Henry D. Williams
Atty.

UNITED STATES PATENT OFFICE.

DOMINICK W. SHARKEY, OF SYRACUSE, NEW YORK.

CAROUSEL.

No. 837,890.      Specification of Letters Patent.      Patented Dec. 4, 1906.

Application filed August 4, 1905. Serial No. 272,647.

*To all whom it may concern:*

Be it known that I, DOMINICK W. SHARKEY, a citizen of the United States, residing at Syracuse, in the county of Onondaga and State of New York, have invented certain new and useful Improvements in Carousels, of which the following is a specification, reference being had therein to the accompanying drawings, forming a part thereof.

My invention relates to that class of pleasure apparatus generally known as the "carousel" or "merry-go-round."

My invention has various objects and features, all of which will appear clearly in the light of the hereinafter following particular description of that particular embodiment of my invention which I have illustrated in the accompanying drawings.

I will at this point, however, make brief and general mention of several objects and features of my invention.

One object of my invention is to embody the rotary portion of the carousel apparatus in a top-shaped structure, so that passengers may enjoy the novel sensation of riding or spinning upon or within a mammoth top which spins upon its apex in a manner imitative of the ordinary toy spinning-top.

Other objects of my invention which are also accomplished by the top-like form of rotary structure are to impart maximum strength of the rotary structure and attain maximum altitude and passenger-carrying capacity thereof with a minimum weight of such rotary structure and to concentrate the weight of the rotating structure upon one or more rotary bearings of comparatively small diameter, and hence comparatively small frictional resistance, and at the same time to maintain rigid and safe equilibrium of such rotating structure upon such bearings of small diameter.

Another object is to provide means whereby the passengers may ride or spin upon the top at different altitudes ranging from an altitude slightly above the lower point or apex of the spinning-top to the extreme altitude of such spinning-top.

Another object is to facilitate the handling of crowds of passengers and to provide means whereby a double-ride régime may be efficiently operated to give each passenger two successive rides or spins upon the top.

To these ends my invention comprises a rotary structure having the form of a mammoth spinning-top combined with rotative bearing means, permitting the mammoth top to be rotated about its natural or geometric axis, and motive power means arranged to effect such rotation of the mammoth spinning-top.

In its illustrated embodiment my invention comprehends a rotatable top-shaped structure including compression members or supporting-columns converging toward the bottom or spinning apex of the top and joined by suitable horizontal beams which act not only as floor-supporting members, but which also act as lateral ties or tension members to prevent the spreading of the converging supporting-columns. By this structure I not only attain a maximum strength, altitude, and passenger-carrying capacity with a minimum weight of rotary structure, but also without detracting from the strength of the rotary structure I am enabled to concentrate its weight upon one or more bearings of comparatively small diameter. For instance, without detracting from the strength of the rotating structure I may concentrate practically all of its weight upon a comparatively small rotary bearing located just underneath the lower apex of the top.

In order to insure rigid and safe equilibrium of the rotating top-like structure, my invention comprehends an annular rotary bearing surrounding the rotating-top structure in a horizontal plane some distance above the lower apex of the top, and the illustrated embodiment of this feature of my invention consists in a circular track surrounding the top in a horizontal plane some distance above the lower or spinning apex and supported upon suitable vertical columns.

One feature of my invention consists in the combination of the aforementioned rotary bearing below the spinning apex of the top, together with the upper or annular rotary bearing surrounding the top in a horizontal plane some distance above such lower or apex bearing. By employing this combination I may concentrate the weight of the rotating-top structure in any desired proportion upon the two bearings, and by means of such combination of bearings I insure safe equilibrium of the rotating top. For instance, the major portion of the weight of the rotating top-like structure may be carried by the lower or apex bearing, and the upper or annular bearing may be depended upon to prevent tipping of the top, and thus insure its safe equilibrium.

To provide for carrying the passengers at different altitudes, my invention includes a number of floors suitably secured inside a mammoth hollow spinning-top and a number of balconies suitably supported on the outside of a mammoth spinning-top. For example, the illustrated embodiment of my invention includes a number of sets of floor-beams spanning the converging columns at different altitudes and covered with suitable flooring connected by suitable stairways affording communication from floor to floor, and in this instance the outer balconies are circumferential balconies surrounding the mammoth top and are formed by extensions of the interior floors.

To provide for efficiently conducting a double-ride régime in which each passenger may have two separate successive rides for one fare, my invention comprehends partitioning means dividing the passenger space or floor of a rotating carousel into first-ride and second-ride sections communicating, in the illustrated embodiment, by means of turnstile passage-ways through the partitions. In the illustrated embodiment a given group of passengers is first admitted to one side or section—the first-ride section—of a top-like spinning structure and is permitted to remain in such first-ride section during one turning interval or spin of the top. When the top is stopped, the passengers are passed from the first-ride side or section of the top through the turnstile passage-ways to the other section, or second-ride section, of the top. A new group of passengers is then admitted to the first-ride section of the top, and the top is again spun or rotated for an interval. When the top is again stopped, the passengers are permitted to pass from the second-ride section out onto an exit-platform, after which the passengers from the first-ride section of the top are permitted to pass into the second-ride section thereof, whereupon again a new group of passengers is admitted to the first-ride section of the top. Thus the passenger traffic is manipulated at each interim in the spinning of the top, and each passenger enjoys two rides for one admission fee or fare.

My invention comprehends various other objects and features, which will appear clearly in the light of the following particular description and which therefore need not be enumerated at this juncture.

I will now particularly describe that particular embodiment of my invention which is illustrated in the drawings and will thereafter point out my invention in claims.

Figure 2:
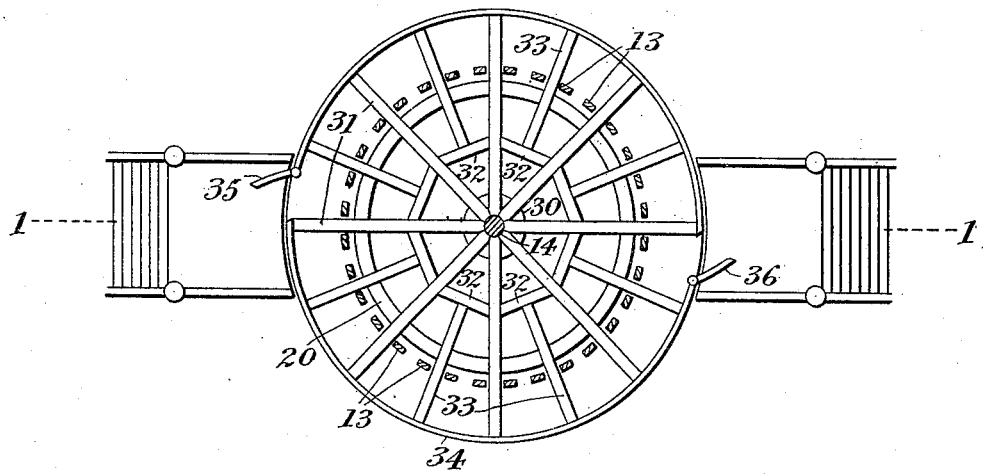
Figure 4:
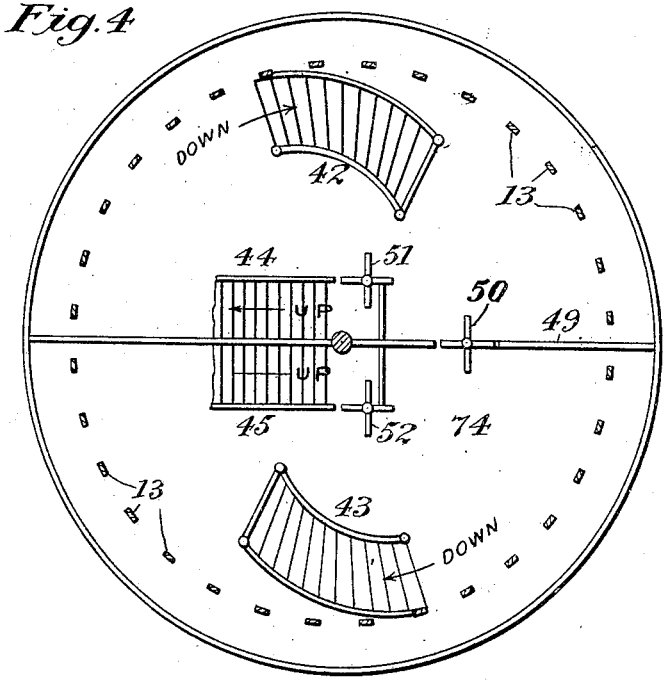
Figure 3:
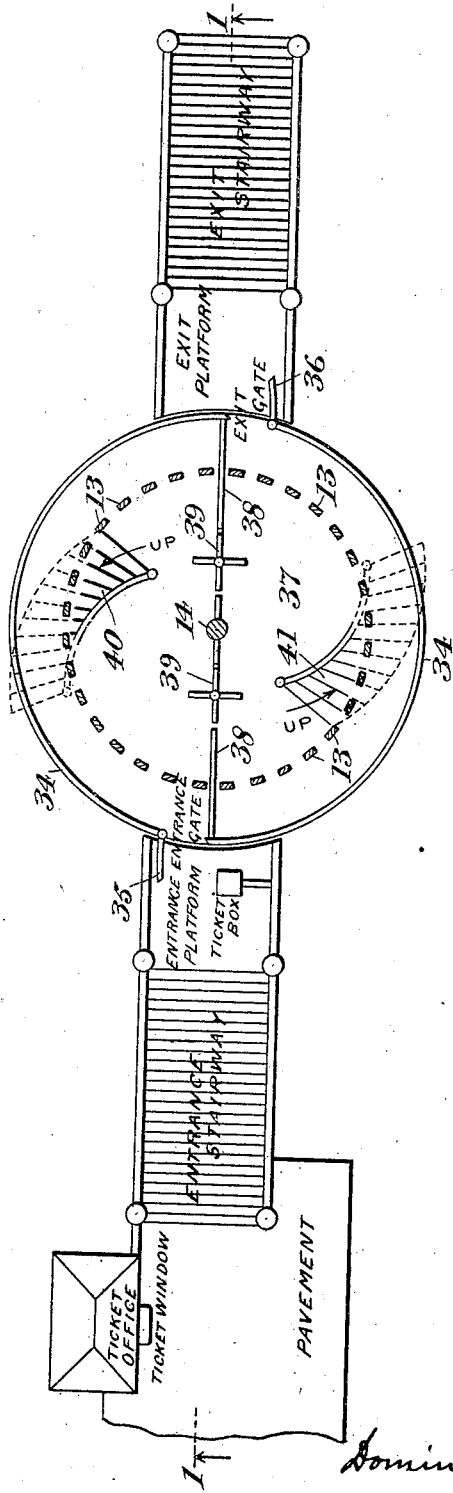

Referring now to the accompanying drawings, Figure 1 is a vertical middle sectional elevation of the illustrated embodiment of my invention, the vertical plane of section being indicated by the line 1 1 of Figs. 2 and 3. Fig. 2 is a plan view of the illustrated embodiment of my invention and shows the rotary top-like structure thereof partially in section on the horizontal plane of the upper surfaces of the floor-beams of the lower floor as indicated by the line 2 2 of Fig. 1. Fig. 3 is a plan view similar to that of Fig. 2, but shows a plan of the first floor of the top-like structure in lieu of a horizontal section just above the floor-beams, and shows the ticket-office, entrance stairway and platform, and exit platform and stairway. Fig. 4 is a plan view similar to that of Fig. 3, but shows a third-floor plan in lieu of a first-floor plan.

The top-like rotary structure is built about a central vertical main column 14. The lower end of the main column 14 is inserted into a lateral bearing 6 in the circular stationary main bearing-plate 7, mounted on the foundation 5. A heavy rotary main bearing-plate 8 is securely mounted upon the main column 14 a short distance above the stationary bearing-plate 7, and a number of spherical bearing-balls 9 are interposed between the two bearing-plates. The balls preferably run in an annular groove or race in the stationary bearing-plate. A worm-wheel 68 is secured upon the main column just above the rotary bearing-plate 8. A conical apex hub 11 is centrally secured upon the main column 14 just above the worm-wheel 68. The apex end of the hub 11 points downward and rests upon the top of the worm-wheel. A number of compression-columns 12 converge downwardly toward the main column 14 and meet such column in the top plane of the apex hub 11, upon which the columns 12 rest. The upper ends of the columns meet and are secured to—for instance, by means of angle-irons 24—the lower sides of the main and supplementary radial floor-beams 31 and 33, respectively, of the first floor. The upper ends of the converging columns 12 are also secured to the inner side of the circular sill or beam 20, which is also secured to the under sides of the radial floor-beams 31 and 33 at points just outside such converging columns 12. As will be noted more fully hereinafter, the principal purpose of the circular sill 20 is to attain the top-like form and appearance of the finished rotatable structure.

A combined beam-brace and roller-bracket 19 is secured to the outer sides of the converging columns 12 and to the lower sides of the radial floor-beams 31 and 33 substantially at the corners made by such converging columns and radial floor-beams, and such member 19 spans and is also secured to the circular sill located in such corners. Bearing-rollers 18 are rotatably mounted in the roller-brackets 19. These bearing-rollers 18 are grooved and run upon a circular track 17, mounted upon a number of suitable vertical columns 15, supported upon the foundation 5. Suitable stays 16 extend from the upper ends of the track-columns 15 to the ground or other suitable support and render the track rigid.

The main radial floor-beams 31 of the first floor are secured to a common circular hub or step 30, fastened upon the main column 14 just below the first floor. These main beams 31 radiate horizontally from the main column 14, and at points between their extremities these main radial floor-beams 31 are joined by supplementary or bridging beams 32. Supplementary radial beams 33 extend outward from midway points on the bridging-beams 32. These supplementary radial beams 33 are disposed midway between the adjacent main radial beams 31 and are outwardly coextensive with such main radial beams. Both the main and supplementary radial beams extend some distance beyond the circular sill 20 to form an annular balcony, as will be hereinafter more fully described.

Converging columns 62 are secured, by means of angle-irons 25, to the main and supplementary radial floor-beams 31 and 33 of the first floor at points just above the converging columns 12 below such first floor. The converging columns 62, thus connected to the radial beams of the first floor by means of suitable angle-irons, such as 25, extend upwardly and outwardly from the first floor to points of connection with the main and supplementary radial beams of the second floor, such latter connections being made by suitable angle-irons, such as 29. These main and supplementary radial floor-beams of the second floor are connected by cross-beams or bridging-beams like those 32 of the first floor, and the main radial beams 53 are similarly connected to the main column 14 by means of a central step or hub 30.

A circular sill or beam 21 is secured by angle-irons, such as 26, to the under sides of the main and supplementary radial floor-beams of the second floor. This circular sill 21, like the sill 20, is designed to give the top-like form to the finished structure. The radial floor-beams extend horizontally some distance beyond the circular sill 21 to form a balcony.

The floor-beams of the third floor comprise main radial floor-beams 56 and supplementary radial floor-beams like those 33 of the first floor, such beams being connected by bridging-beams like those 32 of the first floor, and the main radial beams 56 being similarly connected to the main column 14 by means of a circular step 30. The main and supplementary radial floor-beams of the third floor are also supported upon converging columns 63, secured by angle-irons 29 to the under sides of such radial floor-beams and thence converging downwardly to points where such columns are connected by angle-irons 71 with the radial floor-beams of the second floor. Such lower connections of the converging columns 63 are opposite the upper connections of the converging columns 62. A circular sill 22 is connected, by means of angle-irons 27, to the under sides of the radial floor-beams of the third floor. This circular sill also serves to impart the top-like form to the finished structure. The radial floor-beams of the third floor extend some distance beyond the circular sill 22 to form a third-floor balcony.

The arrangement of floor-beams on the fourth floor is substantially the same as the arrangement on the third floor; but the circular sill 23 underneath the fourth floor is of smaller diameter and is secured by (angle-irons, such as 28, fastened to the circular sill and to the converging columns 64) in the outer corners made by the junctures of the floor-beams and the converging columns 64, which extend downward to the floor-beams of the third floor and are connected therewith by angle-irons 70 at points opposite the connections of the converging columns 63. The circular sill 23, like the other circular sills, imparts the top-like form to the finished structure, and the floor-beams of the fourth floor extend some distance beyond its circular sill to form a fourth-floor balcony.

Top-forming ribs 13 are disposed as superficial linear elements of a top form and are secured upon the outer surfaces of the lower or apex hub 11 and the circular sills 20, 21, 22, and 23. The top-forming ribs are placed at equiangular intervals, and above the first floor the spacing is sufficient to permit a person to pass freely between two adjacent ribs. Thus the top-forming ribs make an open cage-like structure, and they are so close together as to approximate the appearance of the surface of a mammoth spinning-top, while at the same time the ribs act as weight-supporting members which coöperate with the converging columns and other strengthening elements of the structure as a whole. Above the fourth floor the top-forming ribs 13 converge upwardly from the fourth-floor circular sill 23 to the dome or pinnacle of the spinning-top. At the dome of the top and for some distance around its geometric axis the top-forming ribs 13 come so close together as to form a floor upon which is mounted a circular timber 70, which supports a circular railing 47, forming a small observatory space at the pinnacle of the spinning-top.

The floor-beams of all the floors are covered with suitable flooring, marked 37, 73, 74, and 75 on the first, second, third, and fourth floors, respectively. Each floor extends out to the extreme ends of its respective radial floor-beams, and circular railings 34, 65, 66, and 67 are secured upon the ends of the radial floor-beams of the first, second, third, and fourth floors, respectively, thus forming railed balconies outside the superficial form of the spinning-top proper.

The first, second, and third floors are divided into first-ride and second-ride sections by diametric partition-rails 38, 48, and 49, respectively, extending from the balcony-rails on one side to the balcony-rails on the opposite side of the mammoth top. Two turnstiles 39 permit passage of passengers from the first-ride side of the first floor through the partition-rail to the second-ride side thereof, and two turnstiles 76 perform a similar function on the second floor. The third floor has only one turnstile 50 in the third-floor diametric partition-rail, but has two additional turnstiles 51 and 52 at the bottom of the two stairways 44 and 45, respectively, leading from the first-ride and second-ride sides or sections of the third floor upward to the fourth floor. These stairways are divided by a partition-rail running from the third-floor partition-rail upward to the fourth floor.

A suitable ticket-office may be located at one side of the mammoth spinning-top, as indicated, and from thence an entrance-stairway may lead to a suitable entrance-platform flush with the first floor of the mammoth top. Here a suitable ticket-receiving box may be located and the mammoth top may be stopped, so that the entrance-gate 35, affording access through the balcony-rail 34, will come opposite the entrance-platform and permit the passengers to step from the platform onto the first-floor balcony. This entrance-gate 35 communicates only with the first-ride side of section or the first floor, and when the mammoth top is stopped in this position an exit-gate 36 in the balcony-rail of the second-ride section of the first floor affords egress from such second-ride section to an exit-platform, which may be diametrically opposed to the entrance-platform. A suitable exit-stairway leads from the exit-platform to the ground-level.

Curved stairways 40 and 41 lead, respectively, from the first-ride and second-ride sections of the first floor upward to the first-ride and second-ride sections, respectively, of the second floor. These stairways lie against and follow the curve of the mammoth-top surface formed by the top-forming ribs 13. Similar stairways lead from the first-ride and second-ride sections of the second floor upward to the first-ride and second-ride sections of the third floor. The stairways 44 and 45, extending, respectively, from the first-ride and second-ride sections of the third floor upward to the fourth floor are straight stairways and, as already noted, are divided by a partition-rail.

In that particular embodiment of my invention which I have illustrated the fourth floor is not partitioned, and a spiral ladder 46 leads from the fourth floor upward around the main central column 14 to a hatchway-opening into the observation-space surrounded by the circular railing 47 on the pinnacle of the mammoth top. A circular sill or hatch-timber 69 surrounds the hatchway underneath the top-forming ribs 13, and such ribs may be secured to this hatch-timber as an anchorage. The main column 14 may extend as an ornamental pole or flagstaff some distance above the pinnacle of the mammoth spinning-top.

It will be noted that the passengers after being admitted to the first-ride section of the first floor can pass freely by way of the stairways to the first-ride sections of the second and third floors and without passing through the partition-turnstiles. In order to enter the fourth floor, however, the passengers must pass from the first-ride section of the third floor through the turnstile 51, which permits movement of passengers going up the stairway only and prevents the passengers from returning by way of such stairway to the first-ride section of the third floor. After reaching the fourth floor the passengers may secure access by means of the spiral ladder 46 to the observation-space at the pinnacle of the mammoth top.

After one turning or spinning operation the passengers are caused to pass from the observation-space down the spiral ladder 46 and from the fourth floor down the stairway leading to the second-ride section of the third floor and through the turnstile 52 at the bottom of such stairway, permitting movement of passengers only in such direction leading to the second-ride section of the third floor and not in reverse direction from such second-ride section up again to the fourth floor. Also during the interim between turning or spinning operations the passengers are caused to pass from the first-ride sections of the first, second, and third floors to the second-ride sections of such floors by way of the partition-turnstiles, which permit movement of passengers in this direction only. After the passengers have been thus moved from the observation-space at the pinnacle of the mammoth top and from the fourth floor and from the first-ride sections of the first, second, and third floors into the second-ride sections of the first, second, and third floors another group of passengers is admitted to the first-ride sections of the first, second, and third floors and to the entire fourth floor and observation-space. The mammoth top is then carried through another turning or spinning operation, after which the second-ride passengers are caused to leave the second-ride sections of the first, second, and third floors by means of the stairways and the exit-gate 36. Thereupon the first-ride passengers are transferred, as has been already described, so as to evacuate the first-ride sections of the first, second, and third floors and the entire fourth floor and observation space for the admission of a new group of first-ride passengers.

A suitable engine may be located in an engine-room built underneath the exit-platform and stairway, as indicated, and this engine may be connected by a worm-shaft, as shown, with the worm-wheel 68. Such an arrangement of motive-power apparatus will drive or rotate the mammoth spinning-top efficiently.

It will be apparent that my broad invention may be embodied in various specific structures and in various arrangements of its component elements besides the specific structure and arrangement particularly described in the foregoing specification and illustrated in the accompanying drawings, all such embodiments fully coming within the scope, principles, and intent of my invention and claims.

What I claim, and desire to secure by Letters Patent, is—

1. A carousel apparatus comprising, in combination, a substantially top-shaped structure, a top-supporting structure terminating between the lower apex of the top and its plane of maximum diameter, and mounted on the top-supporting structure, an annular rotary bearing for the top-shaped structure disposed between its plane of maximum diameter and its lower apex whereby to permit rotation of the top-shaped structure on its geometric axis and also by natural convergence of the top-shaped structure to concentrate its bearing pressure on an area less than the maximum cross-sectional area of the structure, and motive-power means arranged to rotate the top-like structure on its annular bearing.

2. A carousel apparatus comprising, in combination, a rotatable open cage-like structure including spaced members disposed as converging superficial linear elements of a mammoth spinning-top and including circular circumferential side sills or beams of graduated diameters disposed in parallel planes and circumferentially inside the aforementioned spaced members and suitably secured to such spaced members, and the carousel apparatus comprising also rotative bearing means arranged to permit rotary motion of the mammoth spinning-top structure about its geometric axis, and motive-power means arranged to rotate the mammoth top.

3. Carousel apparatus consisting in a rotatable structure formed substantially as a mammoth spinning-top, an inclosed passenger-space on the dome or pinnacle of the mammoth top, means of access to the passenger-space, rotative bearing means arranged to permit axial rotation of the mammoth top, and motive-power means arranged to effect such axial rotation.

4. Carousel apparatus consisting in a rotator formed substantially as a mammoth hollow spinning-top and having a passenger-receiving space on the dome of the mammoth top and a dome-hatchway leading to such passenger-receiving space, an axial column within the hollow mammoth spinning-top, a spiral footpath winding about the axial column and leading upward to the dome-hatchway, means of passenger access to the spiral pathway, a rotative bearing for the mammoth-top rotator, and motive-power means arranged to effect rotation thereof.

5. Carousel apparatus comprising a rotatable passenger-carrier, a partition dividing the passenger-space therein into two sections, traffic-controlling means arranged to control movement of passengers from one carrier-section to the other, means of ingress to one section, means of egress from the other section, and motive-power means arranged to rotate the passenger-carrier.

6. Carousel apparatus comprising a rotatable passenger-carrier, a partition dividing the passenger-space therein into first-ride and second-ride sections, means of passenger ingress to the first-ride section, means of passenger access to the second-ride section from the first-ride section, means of passenger egress from the second-ride section, and motive-power means arranged to rotate the rotatable carrier.

7. Carousel apparatus comprising a rotatable passenger-carrier having an elevated passenger-carrying space divided by a partition into two passenger-carrying sections, traffic-controlling means arranged to control movement of passengers from one passenger-carrying section to the other passenger-carrying section, an elevated platform arranged for passenger ingress to one of the passenger-carrying sections of the rotatable carrier, an elevated platform arranged for passenger egress from the other passenger-carrying section, and motive-power means arranged to rotate the carrier.

8. Carousel apparatus comprising a rotatably-mounted passenger-carrier formed substantially as a mammoth hollow spinning-top, passenger-carrying floors extending across the mammoth hollow top and projecting as balconies beyond the superficial form of the top proper, partitions dividing the floors into first-ride and second-ride sections, stairways connecting the first-ride sections of the different floors, stairways connecting the second-ride sections of the different floors, traffic-controlling means arranged to control movement of passengers from the first-ride sections to the second-ride sections, means of passenger ingress to the first-ride section of one of the floors, means of passenger egress from the second-ride section of one of the floors, and motive-power means arranged to rotate the passenger-carrier.

9. Carousel apparatus comprising a rotary carousel proper including a passenger-floor, a partition dividing the passenger-space thereof into two sections, passenger-traffic-controlling means arranged to control movement of passengers from one section to the other, and diametrically opposite stationary platforms substantially on a level with the passenger-floor and arranged to communicate with respective sections thereof when the carousel proper is arrested in a given position.

10. Carousel apparatus comprising circular side sills of graduated diameters coaxially disposed in parallel planes, spaced converging members secured to the circular side sills to form the superficial linear elements of a mammoth hollow spinning top and thus simulate the top form, one or more sets of floor-beams secured to one or more of the circular side sills and projecting across the space within the mammoth hollow spinning-top and also projecting outward from the side sills to form balcony-beams, one or more floors mounted on the one or more sets of floor-beams, and means for rotating the mammoth hollow spinning-top.

In testimony whereof I have affixed my signature in presence of two witnesses.

DOMINICK W. SHARKEY.

Witnesses:
 HENRY D. WILLIAMS,
 BERNARD COWEN.